G. F. DOWNS.
SINTERING PROCESS FOR THE RECOVERY OF METALLIC OXIDS FROM FLUE DUST.
APPLICATION FILED AUG. 6, 1914.
1,127,209.
Patented Feb. 2, 1915.
3 SHEETS—SHEET 1.
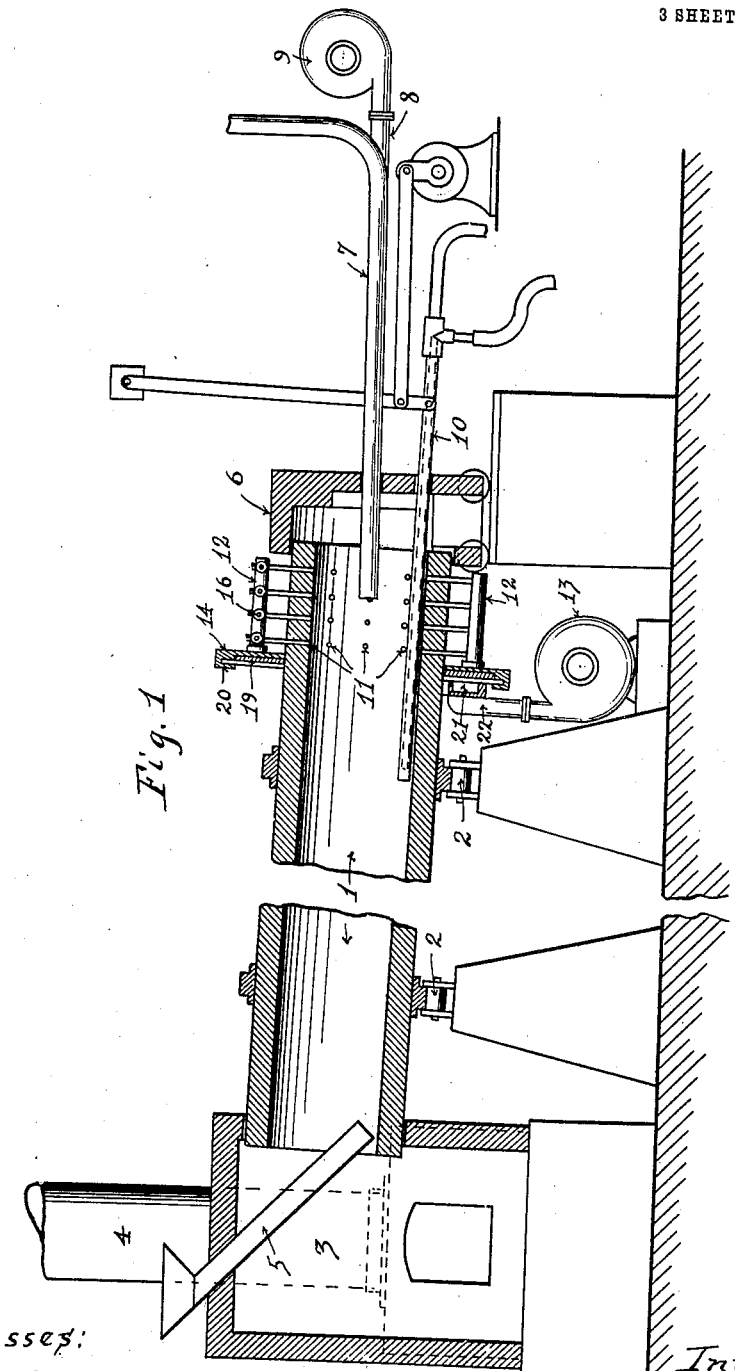
Witnesses:
Richard Sommer
D. H. Harper
Inventor:
George F. Downs,
by A. J. Sangster
Atty.

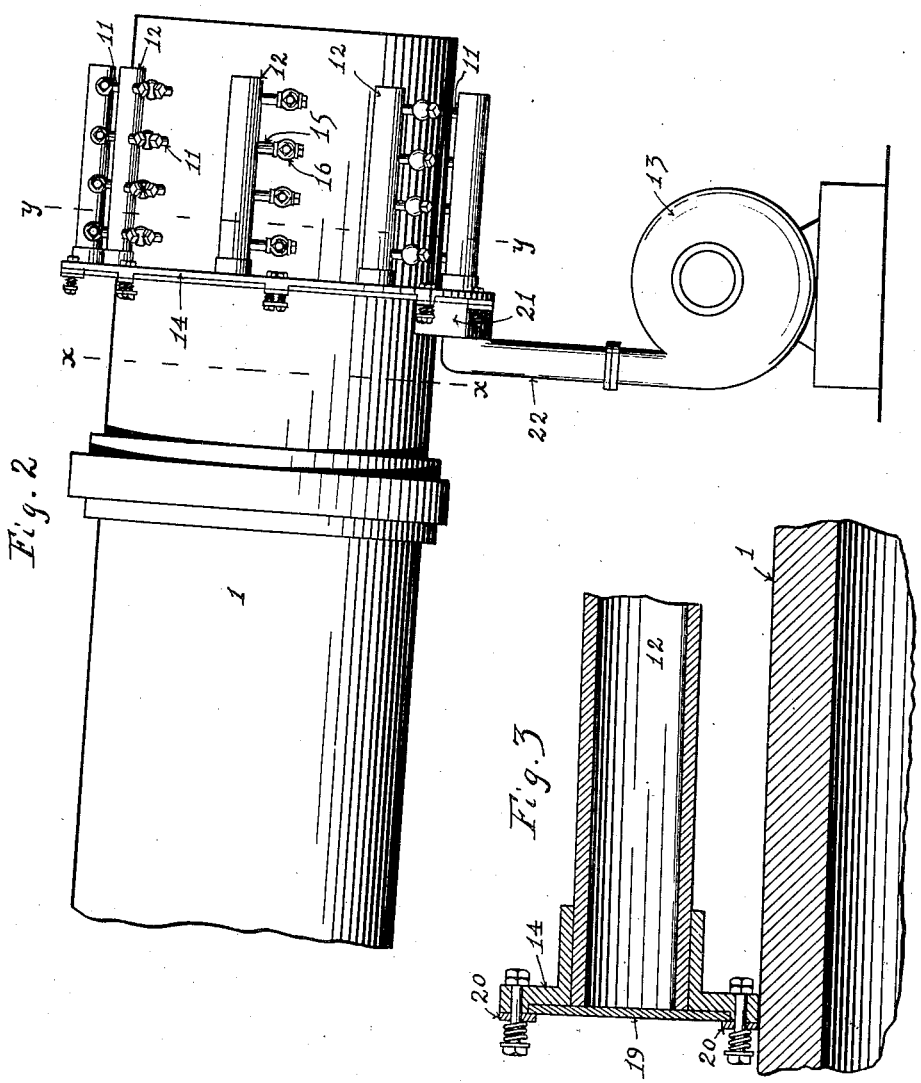

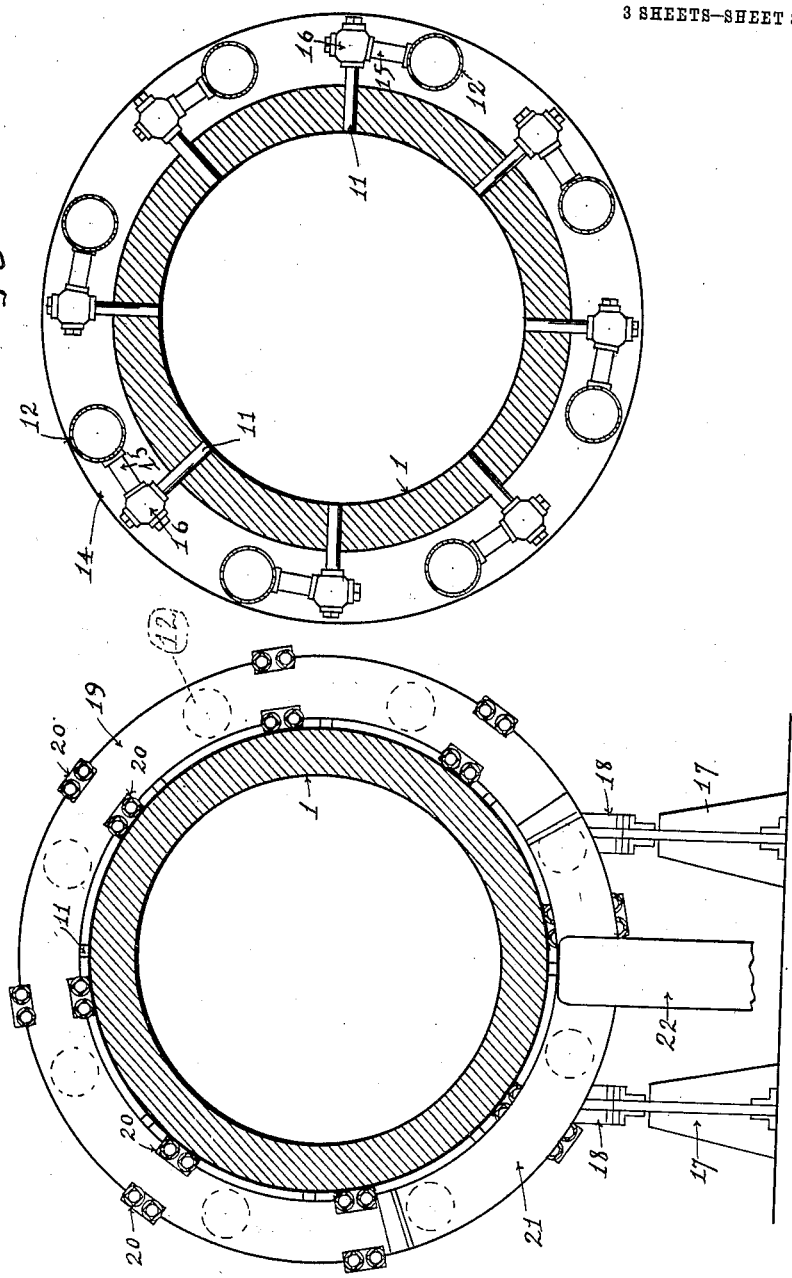

UNITED STATES PATENT OFFICE.

GEORGE F. DOWNS, OF BUFFALO, NEW YORK.

SINTERING PROCESS FOR THE RECOVERY OF METALLIC OXIDS FROM FLUE-DUST.

1,127,209. Specification of Letters Patent. Patented Feb. 2, 1915.

Application filed August 6, 1914. Serial No. 855,431.

*To all whom it may concern:*

Be it known that I, GEORGE F. DOWNS, a citizen of the United States, residing at Buffalo, in the county of Erie and State of New York, have invented certain new and useful Improvements in Sintering Processes for the Recovery of Metallic Oxids from Flue-Dust, of which the following is a specification.

My invention relates to a sintering process, and more particularly to an improved process of treating raw blast furnace flue dust in such a manner as will cause the iron ores in such dust to agglomerate into masses or nodules by the application of blasts of air which violently agitate the flue dust and which supply sufficient air to produce the required degree of heat, through combustion of the carbon contained in the flue dust, to sinter the flue dust while so agitated. And my process is, furthermore, continuous in operation, as distinguished from prior sintering methods which are intermittent.

As is well known in the manufacture of pig iron in a blast furnace, a considerable quantity of comminuted material, known as flue dust, containing fine iron ore, coke and limestone, is carried out of the furnace by the waste gases and collected. It has heretofore been proposed to agglomerate this flue dust in various ways, but the most effective method has been to subject the flue dust, while passing in a rotary furnace, to the condition of heat produced by means of fuel blown in at the delivery end of the furnace.

My invention relates to this general method of treatment, and I propose in my process to utilize the heat from the combustion of the particles of carbon in the flue dust directly upon the iron-bearing materials to agglomerate them into a sinter, and to cause the sintering to take place without the addition of fuel or binding material by producing violent agitation of the flue dust during the period of combustion of its carbon content.

This process, while independent of any specific apparatus for carrying it into effect, has been successfully carried out in an apparatus such as is shown in my pending application, rotary furnace kilns, filed April 25, 1914, Serial No. 834,389, in which the various accessories and adjustments requisite for temperature and other control have been determined by me. Therefore, I shall, in describing and illustrating my process, prefer to use an apparatus similar in character to that shown in said application. Of course other apparatus may be adopted for carrying out my process, but said apparatus provides means for effecting three essential features of my process, namely, continuous sintering, supply of air to produce the required heat from combustion of the carbon content without the addition of other fuel, and violent agitation of the flue dust during the period of combustion of said carbon content.

In the drawings illustrating my process, in which like characters of reference indicate corresponding parts, Figure 1 is a longitudinal, vertical section of a furnace provided with the means for carrying out my process. Fig. 2 is an enlarged detail side elevation of the twyer section of the furnace. Fig. 3 is an enlarged section of one of the manifolds employed. Fig. 4 is a section on $x$—$x$ of Fig. 2. Fig. 5 is a section on $y$—$y$ of Fig. 2.

Referring to the drawings, 1 indicates a rotary kiln in the form of a hollow cylinder, suitably lined with refractory material. Said kiln is mounted on rollers 2, so that it may rotate freely. The cylinder is rotated by any desired well-known means. The furnace of kiln 1 is inclined slightly for this process from its inlet to its outlet end, so as to insure the travel of the mixture through the kiln.

In operation the kiln is rotated slowly, and in the passage of the material therethrough, it is agitated by being carried up on one side of the kiln and falling back to the bottom. By varying the speed of rotation of the kiln the size of the lumps or masses can be governed. The upper end of the kiln 1 opens into a chamber 3, provided with a stack 4 for the disposal of gases and products of combustion. Extending through the chamber 3 is a feed chute 5, which continuously discharges the material to be treated into the open end of the kiln. The lower end of the kiln 1 rotates in a stationary hood structure 6, mounted on wheels, so that it may be readily moved to and from the kiln, and is provided with an opening through which the materials passing through the kiln are discharged. This hood structure is provided to prevent, so far as possible, the access of air to the kiln. Passing through an opening in the hood is a tube 7 for introducing pulverized fuel or gas, with sufficient supply of air to start combustion when starting the operation. Adjacent to this tube 7 is a tube 8, leading from the blower 9, which may be employed if occasion demands for augmenting the supply of air furnished by the twyers.

It has been found in practice that there is a tendency for the sintered material to adhere to the walls of the furnace, and to prevent this a water-cooled poker 10, having a reciprocating motion, is employed at the lower end of the furnace. This poker 10 is suitably suspended to a swinging hanger and means provided for imparting to the poker a reciprocating motion. This action of the poker scrapes the lining and prevents the sintered material from adhering to the walls of the kiln and dislodges any material which may become attached to the walls of the kiln, thereby promoting the passage of the material therethrough.

In the walls of the kiln, near the discharge end, are air inlet openings, which is herein referred to as the twyer area, equipped with air supply twyers 11, extending from the manifold pipes 12, which communicate with the blower 13.

14 is a circular manifold head, or upstanding circular plate, which is preferably built up of segments and clamped or secured to the kiln in any desired manner. Secured in flanged openings in this circular manifold head 14 are the manifolds or air pipes 12, which lie parallel with the axis of the cylinder. These manifolds are arranged, preferably, symmetrically about the kiln, and may be of any desired length or frequency, according to the material to be treated. The ends of these manifolds opposite the ends secured to said manifold head are closed. Leading from the manifolds are nipples 15, which connect with cross-connections 16, which connect with the twyer pipes 11, which pass into the interior of the cylinder.

Mounted upon supports 17 are brackets 18. Rigidly secured to these brackets is an annular plate 19, preferably built up in segments, which sets face-to-face with the manifold head 14. This plate 19 is held up to the face of the manifold head so as to make a substantially gas-tight contact by means of spring-held clips 20. In this manner the plate 19, which is non-rotating, sets up against the manifold head 14 and over the open ends of the manifolds 12, except as presently described. These contacting surfaces, the one fixed and the other rotating, are well removed from the interior of the furnace and may, therefore be readily lubricated.

Mounted gas tight upon the plate 19 is a wind-box 21, which, for the purposes of this process, is a segment of sufficient length to cover or include one or more of the manifold ends substantially at all times. The portion of the plate 19 covered by this wind-box is slotted to permit the passage of air from the wind-box to the manifolds as they come by rotation within the area thus formed. Connected with the wind-box 21 is a duct 22, which supplies air under pressure from a blower 13.

It will be seen that the foregoing is an abbreviated description of the apparatus shown in my said pending application, Serial No. 834,399, and for further detailed description of the same reference is had to that specification.

My novel process, which may be carried out by such or other adequate apparatus, is as follows: Flue dust is fed regularly and continuously under control through the pipe 5 into the open end of the kiln 1, which is under rotation. A supply of powdered coal or coke is introduced at the lower end through the tube 7, and the blower 9 is started. This fuel, having been ignited, rapidly heats the interior of the kiln to a sintering temperature. I find it very desirable in practice to maintain a temperature in the kiln ranging from six hundred degrees, Fahr., at the feed end to approximately seventeen hundred degrees, Fahr., at or near the discharge end; and the powdered fuel supply through the tube 7 is used, therefore, only to bring the interior of the kiln to a proper sintering temperature and to assist in maintaining this temperature, if it is found that the necessary temperature resulting from the combustion of the coke in the dust will not be sufficient to conduct the sintering process. This results in great economy in fuel consumption, which is one of the objects of the process. Now the heat absorbed by the mixture lowers the temperature in the upper part of the kiln 1 to about six hundred degrees, Fahr. The mixture, therefore, moves along through a gradually increasing temperature and a small part of the coke will be consumed, but there will remain most of the unconsumed coke when it reaches the twyer area. In this area, as the air is supplied through the twyers, rapid combustion of the remaining coke takes place and the metallic content is sintered, taking the form of lumps or nodules. And herein lies the important and differentiating features of my improvements. The flue dust in its continuous progress from the upper end of the kiln to the twyer area has had its temperature raised to the combustion point of the carbon content, but very little of the carbon has actually been converted and little sintering has taken place. But when this heated, continuously-traveling mass reaches the twyer area it is not only supplied with sufficient air to complete the combustion, but with twyer blasts from the lower portion of this area which cause violent agitation and continuous bombardment of the upper portion of this area by the flue dust while its carbon content is in process of burning—which agitation and bombardment results in the mechanical union of the metallic and binder content while the chemical process of combustion is affording the necessary heat to permit such mechanical action. After the sintered material passes the twyer area, it continues by gravitation and rotation to the lower end of the cylinder, where it passes to a receptacle (not shown) in which it may be cooled or conveyed away as desired. It will thus be seen that the material is gradually and thoroughly heated under constant movement and mixing, until by the time it reaches the twyer area, it is at a temperature where the contained carbons will readily combine chemically with the oxygen there supplied; in this area the most intense heat and fusing action occurs and the actual agglomeration is accomplished here, as above described, instead of being distributed through a considerable length of the kiln.

Having thus described my process and the method of carrying the same into effect, I claim:—

1. The herein described process of reducing flue dust which consists of passing flue dust in a continuous mass through a rotating cylindrical kiln or furnace slightly inclined from the horizontal and subjecting the flue dust to blasts of air through numerous twyers so regulated that the air is admitted underneath the flue dust and violently agitates and lifts the flue dust in passing through it and creates sufficient heat through the combustion of the carbon contained in the flue dust with the oxygen contained in the air to sinter or nodulize the flue dust.

2. The herein described process of reducing flue dust which consists of progressively heating a continuous discharge of flue dust and delivering it to a twyer area at a temperature substantially that at which the carbon content will combine with an oxygen supply to cause thorough combustion, then blasting into said twyer area and beneath the heated flue dust air under pressure to violently agitate said flue dust and to supply the necessary oxygen for combustion, whereby, while the chemical operation of combustion is taking place, the metallic and binder content of the flue dust are mechanically combined in a heated state by said agitation.

GEORGE F. DOWNS.

Witnesses:
RICHARD SOMMER,
D. H. HARPER.